(No Model.)

F. G. DAVIS.
DEVICE FOR PACKING VEHICLE WHEELS.

No. 518,395. Patented Apr. 17, 1894.

Witnesses:
Theo. L. Popp.
Chas. F. Burkhardt.

F. G. Davis Inventor.
By Wilhelm Bonner
Attorneys.

UNITED STATES PATENT OFFICE.

FRANCIS G. DAVIS, OF WATERTOWN, NEW YORK.

DEVICE FOR PACKING VEHICLE-WHEELS.

SPECIFICATION forming part of Letters Patent No. 518,395, dated April 17, 1894.

Application filed July 24, 1893. Serial No. 481,273. (No model.)

*To all whom it may concern:*

Be it known that I, FRANCIS G. DAVIS, a citizen of the United States, residing at Watertown, in the county of Jefferson and State of New York, have invented new and useful Improvements in Devices for Packing Vehicle-Wheels, of which the following is a specification.

This invention relates to a device for packing vehicle wheels for transportation and has the object to produce a simple device whereby wheels can be securely and expeditiously clamped to the crate.

Figure 1:
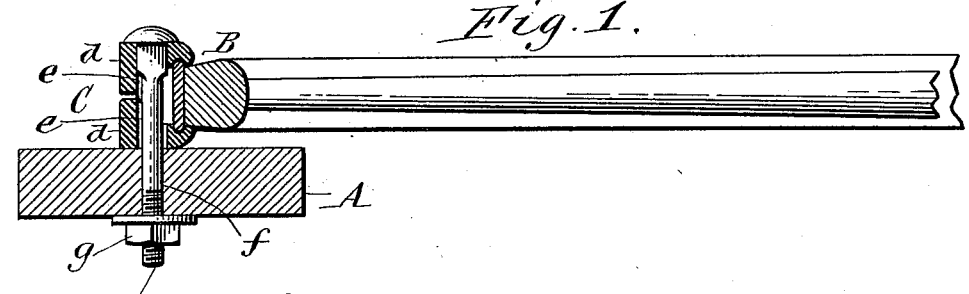
Figure 2:
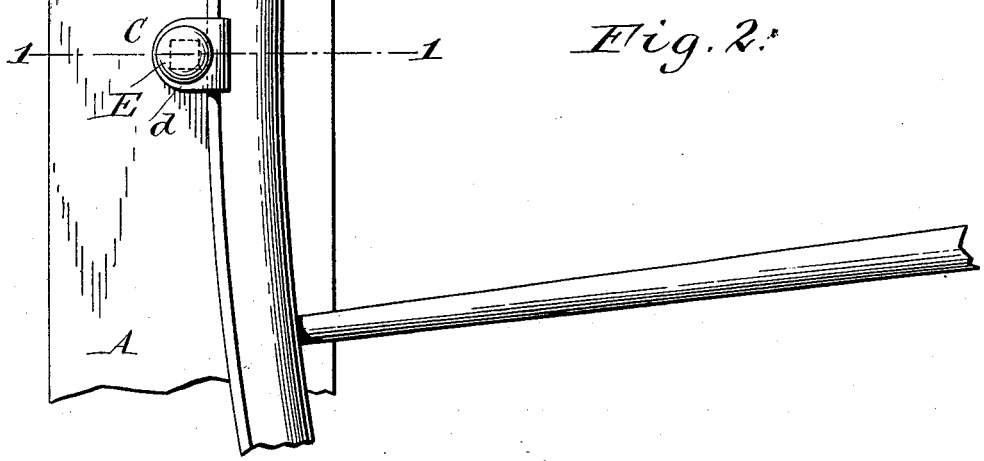
Figure 3:
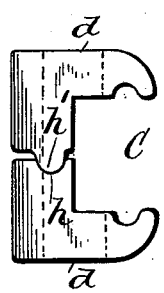
Figure 4:
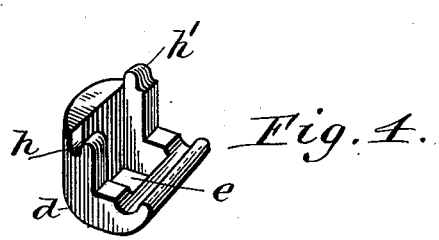

In the accompanying drawings:—Figure 1 is a fragmentary section of a wheel and crate secured together by my improved clamp, the section being taken in line 1—1, Fig. 2. Fig. 2 is a top plan view of the same. Fig. 3 is a side elevation of the clamping jaws, on an enlarged scale. Fig. 4 is a perspective view of one of the clamping jaws.

Like letters of reference refer to like parts in the several figures.

A represents a bar of a crate and B the rim of the wheel to be secured in the crate.

C represents one of a number of clamps, which are applied to the rim of the wheel and whereby the latter is secured in the crate. Each of these clamps consists of two jaws $d\ d$, which bear with their biting faces against opposite edges of the tire or wheel rim, and a tie bolt E which passes not only through openings $e$ in the jaws, but also through an opening $f$ in the bar of the crate. One of the jaws $d$ is arranged between the wheel rim and the crate bar, thereby holding the wheel out of contact with the bar and preventing the wheel from being marred. The head of the tie bolt bears against the other jaw $d$ and its nut $g$ bears against the opposite side of the crate bar. Upon tightening the nut the jaws are drawn against opposite sides of the tire or wheel rim and are rigidly secured to the crate bar, thereby firmly securing the wheel to the crate in such manner that it will not become marred.

In order to prevent the two jaws from turning on each other around the bolt while applying the clamp to the wheel, the jaws are provided at their contiguous bearing faces with interlocking devices, consisting of a recess $h$ and a tenon $h'$ arranged on opposite sides of the bearing face of each jaw, so that the jaws are exactly alike. The recess and the tenon on the same jaw are so arranged that a line drawn through them runs parallel with the biting face of the jaw. Upon assembling the parts of the clamp the tenon of one jaw enters the recess of the other jaw whereby the jaws are held in alignment. The recesses and tenons are preferably rounded so as to form pivotal supports on which the jaws can rock slightly as they are tightened upon the wheel rim.

I claim as my invention—

1. The combination with the crate bar, of two movable jaws adapted to bear against opposite sides of a wheel and capable of movement toward and from each other, a screw bolt which passes through both jaws and extends beyond the same sufficiently to pass through the crate bar, and a screw-nut applied to the screw bolt, whereby the jaws are tightened against opposite sides of the wheel and are also attached to the crate bar, substantially as set forth.

2. A clamping device for packing wheels consisting of two jaws adapted to bear against opposite sides of the wheel and provided with rounded interlocking tenons and recesses, and a tie bolt connecting said jaws, whereby the jaws are enabled to rock on each other and adjust themselves to the wheel as they are tightened, substantially as set forth.

3. A clamping device for packing wheels having jaws adapted to bear against opposite sides of the wheel, each provided with a tenon and a recess arranged in line with each other on the same jaw, whereby two jaws, which are exact duplicates of each other, form a pair, substantially as set forth.

Witness my hand this 18th day of July, 1893.

FRANCIS G. DAVIS.

Witnesses:
LOUISE SEIPEL,
JOHN E. FOLEY.